United States Patent
Liu et al.

(10) Patent No.: US 12,456,296 B2
(45) Date of Patent: Oct. 28, 2025

(54) VIDEO DISPLAY METHOD AND DISPLAY SYSTEM BASED ON UNMANNED AERIAL VEHICLE VIEWING ANGLE

(71) Applicant: ARASHI VISION INC., Shenzhen (CN)

(72) Inventors: Jingkang Liu, Shenzhen (CN); Wenjie Jiang, Shenzhen (CN); Yibin Guo, Shenzhen (CN); Shun Jia, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 0 days.

(21) Appl. No.: 18/566,141

(22) PCT Filed: May 23, 2022

(86) PCT No.: PCT/CN2022/094398
§ 371 (c)(1),
(2) Date: Dec. 1, 2023

(87) PCT Pub. No.: WO2022/253018
PCT Pub. Date: Dec. 8, 2022

(65) Prior Publication Data
US 2024/0290087 A1 Aug. 29, 2024

(30) Foreign Application Priority Data
Jun. 2, 2021 (CN) .......................... 202110614383.1

(51) Int. Cl.
*G06V 20/17* (2022.01)
*B64C 39/02* (2023.01)
(Continued)

(52) U.S. Cl.
CPC ............ *G06V 20/17* (2022.01); *B64C 39/024* (2013.01); *H04N 23/68* (2023.01); *H04N 23/698* (2023.01); *B64U 10/13* (2023.01); *B64U 2101/30* (2023.01)

(58) Field of Classification Search
None
See application file for complete search history.

(56) References Cited

U.S. PATENT DOCUMENTS

2012/0249797 A1    10/2012   Haddick et al.
2018/0181119 A1*   6/2018    Lee ..................... G05D 1/0038
(Continued)

FOREIGN PATENT DOCUMENTS

CN    105872467 A    8/2016
CN    105979242 A    9/2016
(Continued)

OTHER PUBLICATIONS

Office Action issued Feb. 27, 2025 in Chinese Patent Application No. 202110614383.1 with English translation thereof.
(Continued)

*Primary Examiner* — Eileen M Adams
(74) *Attorney, Agent, or Firm* — XSENSUS LLP

(57) ABSTRACT

A present invention provides a video display method based on an unmanned aerial vehicle viewing angle, including: acquiring attitude information of an unmanned aerial vehicle; acquiring a video of the surroundings of the unmanned aerial vehicle under the corresponding attitude; acquiring a display viewing angle of the video; and displaying the video according to the display viewing angle, wherein the video includes a spherical panoramic video, an annular panoramic video, or a wide-angle video, and the display viewing angle and the attitude of the unmanned aerial vehicle are independent of each other.

13 Claims, 2 Drawing Sheets

(51) Int. Cl.
  *H04N 23/68* (2023.01)
  *H04N 23/698* (2023.01)
  *B64U 10/13* (2023.01)
  *B64U 101/30* (2023.01)

(56) References Cited

U.S. PATENT DOCUMENTS

| | | | |
|---|---|---|---|
| 2019/0108384 A1* | 4/2019 | Wang | G06V 10/56 |
| 2019/0304120 A1* | 10/2019 | Ma | G06V 20/58 |
| 2022/0205938 A1* | 6/2022 | Michini | G05D 1/689 |

FOREIGN PATENT DOCUMENTS

| | | |
|---|---|---|
| CN | 106023070 A | 10/2016 |
| CN | 106303448 A | 1/2017 |
| CN | 106550182 A | 3/2017 |
| CN | 107343177 A | 11/2017 |
| CN | 108124193 A | 6/2018 |
| CN | 108646776 A | 10/2018 |

OTHER PUBLICATIONS

The Second Office Action mailed Jun. 25, 2025, in Chinese Application No. 202110614383.1, 19 pages including English translation.
The Third Office Action mailed Aug. 28, 2025, in Chinese Application No. 202110614383.1, 22 pages including English translation.
Xiaoqiang Hu(Editor) et al., "Virtual Reality Technology and Application", Beijing University of Posts and Telecommunications Press, Beijing, China, published on Dec. 31, 2020, p. 214 (with English Translation), total 6 pages.

\* cited by examiner

VIDEO DISPLAY METHOD AND DISPLAY SYSTEM BASED ON UNMANNED AERIAL VEHICLE VIEWING ANGLE

TECHNICAL FIELD OF THE INVENTION

The present application relates to the technical field of unmanned aerial vehicles, and in particular, relates to a video display method and a display system based on an unmanned aerial vehicle viewing angle.

BACKGROUND OF THE INVENTION

Unmanned aerial vehicle (UAV) have been widely used in surveillance and aerial photography nowadays, and operators can watch images or videos taken by photographing devices on the UAVs through remote display terminals (such as computers, mobile phones or VR helmets or the like) so as to obtain the viewing experience based on the UAV viewing angle.

Most of the existing surveillance or aerial photography schemes for UAVs are to mount a camera head in front of the UAV in the flight direction, and then send videos captured by the camera head to a remote display terminal for the UAV operators to watch, thereby realizing the flight experience from the viewing angle in the flight direction of the UAV.

SUMMARY

In a first aspect, the present invention provides a video display method based on an unmanned aerial vehicle viewing angle, which includes the following steps: acquiring an attitude of an unmanned aerial vehicle; acquiring a video around the unmanned aerial vehicle corresponding to the attitude; acquiring a display viewing angle of the video; displaying the video according to the display viewing angle; wherein the video includes spherical panoramic video, annular panoramic video or wide-angle video, and the display viewing angle and the attitude of the unmanned aerial vehicle are independent of each other.

In a second aspect, the present invention provides a video display system based on an unmanned aerial vehicle viewing angle, which includes an unmanned aerial vehicle and a receiving control terminal; the unmanned aerial vehicle includes a photographing device and a flight control device, the photographing device being configured to shot a video around the unmanned aerial vehicle, and the flight control device being configured to acquire an attitude of the unmanned aerial vehicle and control the movement of the unmanned aerial vehicle; the receiving control terminal includes a remote control device and a display device, the remote control device being configured to send a flight control command to the flight control device of the unmanned aerial vehicle; the display device being configured to acquire a display viewing angle of a video and displaying the video according to the display viewing angle; wherein the video includes spherical panoramic video, annular panoramic video or wide-angle video, and the display viewing angle and the attitude of the unmanned aerial vehicle are independent of each other.

DETAILED DESCRIPTION

In order to make objectives, technical solutions and beneficial effects of the present invention more clear, the present invention will be further illustrated in detail with reference to attached drawings and embodiments. It shall be appreciated that the specific embodiments described here are only used to explain the present invention, and are not intended to limit the present invention.

The surveillance or aerial photography scheme of the unmanned aerial vehicle described above has the following defects.

1. Viewers can only watch images or videos in a specific direction. Because the camera head faces the flight direction of the unmanned aerial vehicle, only images or videos within a certain viewing angle in front of the unmanned aerial vehicle can be seen.

2. Adjustment of the video shooting angle needs to be realized by controlling the flight of the plane, and the operation is complicated. For example, when the operator of the unmanned aerial vehicle needs to continuously observe a video object of interest, it is required to control the unmanned aerial vehicle to turn or turn around in order to re-observe the video object of interest if the video object is no longer within the viewing angle of the camera head.

Therefore, it is necessary to make improvements on the existing surveillance and aerial photography schemes of the unmanned aerial vehicle.

The flight direction of the unmanned aerial vehicle according to the present invention is independent of the display viewing angle of the video around the unmanned aerial vehicle, and therefore, when the unmanned aerial vehicle changes the flight direction, the display viewing angle of the video around the unmanned aerial vehicle for viewing is not affected, and the video based on the unmanned aerial vehicle viewing angle can be viewed at any angle without manipulating the flight direction of the unmanned aerial vehicle, thereby improving the video viewing experience of a viewer based on the unmanned aerial vehicle viewing angle In order to illustrate the technical solutions of the present invention, the following description is made through specific embodiments.

Embodiment 1

Figure 1:
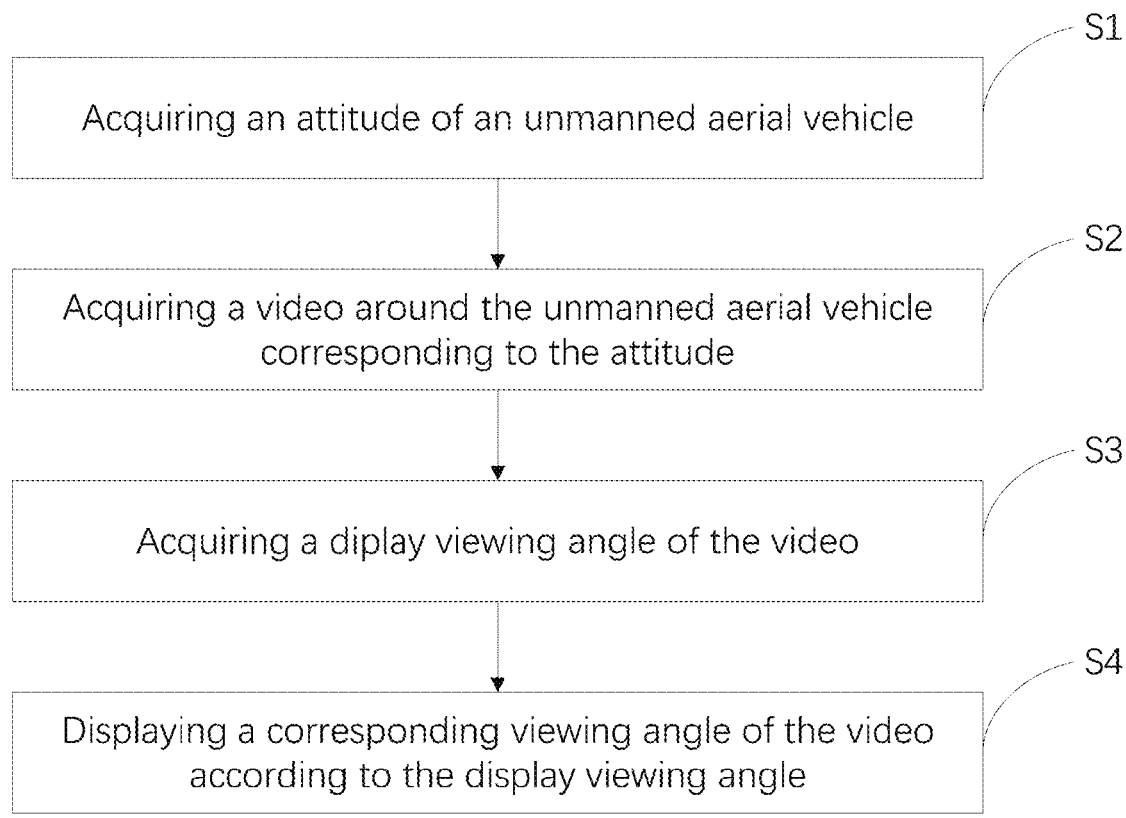
FIG. 1 is a flowchart diagram of a video display method based on an unmanned aerial vehicle viewing angle in Embodiment 1 of the present invention.

As shown in FIG. 1, a video display method based on an unmanned aerial vehicle viewing angle in this embodiment includes the following steps.

S1: acquiring an attitude of an unmanned aerial vehicle.

The attitude in this embodiment includes the flight direction and/or spatial coordinates of the unmanned aerial vehicle, the flight direction of the unmanned aerial vehicle may be acquired by an inertial measurement unit (IMU) mounted on the unmanned aerial vehicle, and the spatial coordinates of the unmanned aerial vehicle may be acquired by a navigation device, for example the global positioning system (GPS).

S2: acquiring a video around the unmanned aerial vehicle.

The video in this step includes spherical panoramic video, annular panoramic video or wide-angle video. The spherical panoramic video is a perspective spherical video formed with the unmanned aerial vehicle as the center of sphere. The annular panoramic video is a part of the spherical panoramic video, which can be obtained by clipping the spherical panoramic video. For example, the annular panoramic video can be formed by clipping a middle circle of the spherical video. The wide-angle video is a video shot by a wide-angle lens or a fisheye lens, whose viewing angle is more than 180 degrees but less than 360 degrees, and the wide-angle video may also be formed by splicing videos shot by multiple lenses.

Taking the spherical panoramic video as an example, no limitation is made to the way in which the panoramic video around the unmanned aerial vehicle is obtained. For example, N lenses (N≥2) are arranged around the unmanned aerial vehicle, and the lenses may be distributed at any position around the fuselage of the unmanned aerial vehicle. The lenses are distributed such that a viewing angle range composed of the N lenses may include a viewing angle of 360 degrees around the unmanned aerial vehicle. That is, the fields of view of adjacent lenses overlap each other to form a 360-degree panoramic viewing angle around the unmanned aerial vehicle.

In this embodiment, after acquiring the panoramic video, the panoramic video may also be processed by the panoramic stabilizing technology to obtain a smooth panoramic video, so as to prevent the video from swaying up and down or from side to side due to the shaking of the unmanned aerial vehicle, thereby reducing the vertigo of the video viewer. The panoramic stabilizing technology can be implemented by adopting any stabilizing technology, such as physical stabilizing technology of three-axis tripod head, electronic stabilizing or algorithm stabilizing technologies or the like.

In an embodiment, two fisheye lenses are adopted which are respectively installed on two opposite sides of the fuselage of the unmanned aerial vehicle (the range of viewing angle of a single fisheye lens is greater than 180 degrees), and the combined viewing angle of the two fisheye lenses reaches 360 degrees. The two fisheye lenses are distributed as follows: the two fisheye lenses are distributed back-to-back on the upper and lower sides, front and rear sides and left and right sides of the fuselage, or distributed back-to-back on the upper or lower parts on the fuselage at the same side of the fuselage, and then the video frames shot at the same time by the two fisheye lenses are integrated into panoramic video frames, thereby acquiring the panoramic video. The splicing of the panoramic video belongs to the prior art, and reference may be made to the relevant description in China Patent Publication No. CN106023070A for details thereof.

In some other implementable schemes, the panoramic video may also be shot by a panoramic camera installed on the unmanned aerial vehicle.

S3: acquiring a display viewing angle of the video.

The display viewing angle in this embodiment includes the display direction, or includes the display direction and the size of the viewing angle. The display viewing angle and the attitude of the unmanned aerial vehicle are independent of each other. Specifically, the display direction of the video may be the same as or different from the flight direction of the unmanned aerial vehicle. In an optimized scheme of this embodiment, the display direction is the same as the flight direction of the unmanned aerial vehicle by default. In some other embodiments, a reference object, such as the nose orientation of a plane, may also be set in the display device, which is convenient for the user to associate the required display direction with the flight direction of the unmanned aerial vehicle.

The display direction may be displayed according to a plurality of preset angles. For example, in the flight coordinate system (the world coordinate system) of the unmanned aerial vehicle, options of the display direction include providing eight rotation angles respectively along axes X, Y and Z (that is, a rotation angle is set every 45 degrees), so that a total of 512 (8*8*8) angles can be formed, and the viewers may determine the angle for displaying by selecting the values of the three axes X, Y and Z. The display direction may also be determined according to operation of users detected by the sensing device, and for example, the display direction may be obtained by operating the mouse to move, controlling the direction of the joystick, and moving the head to drive the operation of VR glasses and the VR head-mounted display.

The panoramic video may be displayed according to a plurality of preset values, such as 90 degrees, 120 degrees, 150 degrees or the like for the viewing angle. The viewing angle may also be enlarged or reduced through the touch screen of the visual terminal.

S4: displaying the video according to the display viewing angle.

Figure 2:
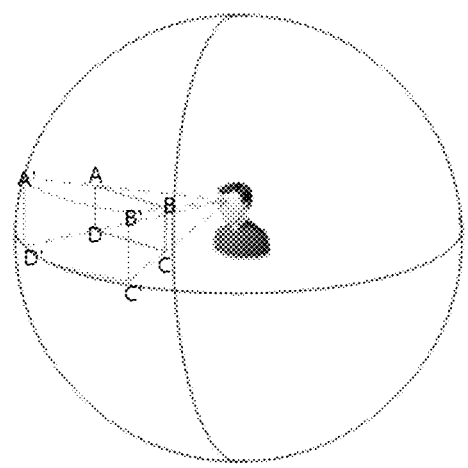
FIG. 2 is a schematic view in which the corresponding part of a panoramic video is displayed on a flat-paneled display screen according to the present invention.

After obtaining the display viewing angle, the video may be displayed on the display device. As shown in FIG. 2, taking the case where a flat-panel display is used to display the panoramic video as an example, when it is required to display the curved surface A'B'C'D' in the spherical surface of the panoramic video after acquiring the viewing angle display information, the curved surface A'B'C'D' may be projected into a flat image ABCD by projection so as to be displayed on the flat-panel display. That is, the corresponding part of the panoramic video is displayed on the flat-panel display screen. As can be known from the above description, in this embodiment, instead of rendering the whole panoramic video, only the corresponding part of the panoramic video needs to be rendered according to the viewing angle display information, which is beneficial to improving the image processing speed and improving the real-time video display based on the viewing angle.

Figure 4:
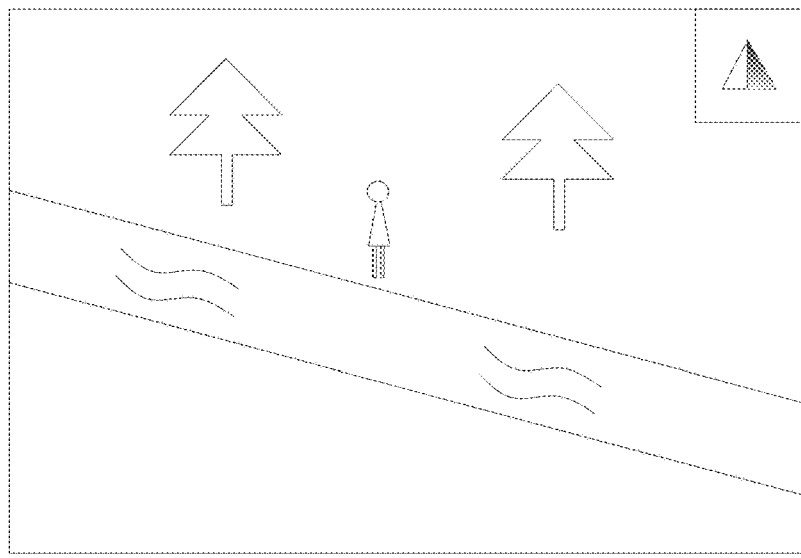
FIG. 4 is a schematic view of a display interface when the unmanned aerial vehicle flies in the direction of the viewer.

Referring to FIG. 4, FIG. 4 is a schematic view of the display interface of the display device seen by the viewer when the unmanned aerial vehicle flies in the direction of the viewer. The trees, rivers and people in the figure are a picture at the corresponding angle in the panoramic video, and the triangle icon in the upper right corner is the flight direction of the unmanned aerial vehicle (of course, the actual coordinate information, e.g., longitude, latitude, and height in the world coordinate system, of the unmanned aerial vehicle may also be added in the figure).

Figure 5:
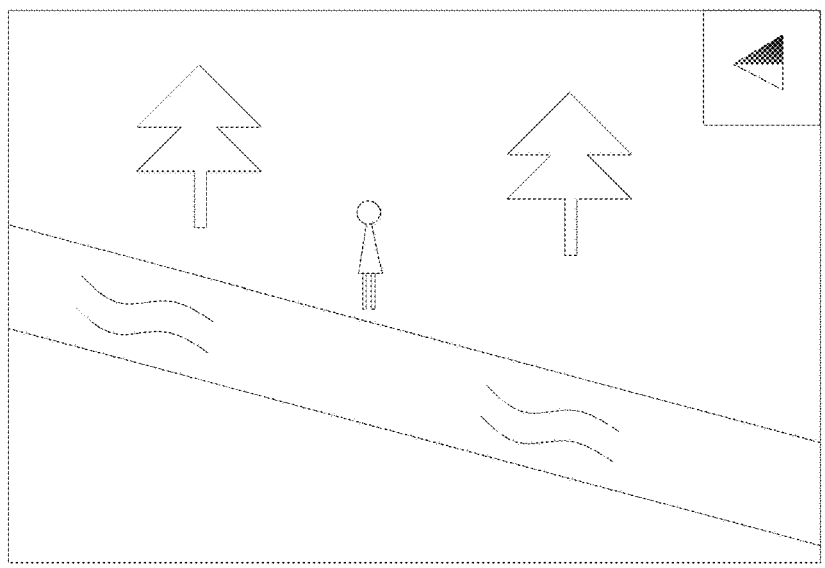
FIG. 5 is a schematic view of the display interface when the unmanned aerial vehicle in FIG. 4 flies to the left.

Referring to FIG. 5, FIG. 5 is a schematic view of the display interface seen by the viewer after the unmanned aerial vehicle receives a control command to fly to the left. Because the unmanned aerial vehicle has flied forward for a certain distance, the trees, rivers and people in FIG. 5 become larger than those in FIG. 4 in a basically smooth manner. At the same time, the direction of the triangle icon in the upper right corner has changed, which may remind the viewer of the current flight direction of the plane.

As can be known through comparing FIG. 4 with FIG. 5, the flight direction of the unmanned aerial vehicle in this embodiment is independent of the display viewing angle of the video around the unmanned aerial vehicle, and thus when the unmanned aerial vehicle changes the flight direction, the display viewing angle of the video around the unmanned aerial vehicle for viewing is not affected, and the picture displayed on the display device is a smooth picture.

Embodiment 2

Figure 3:
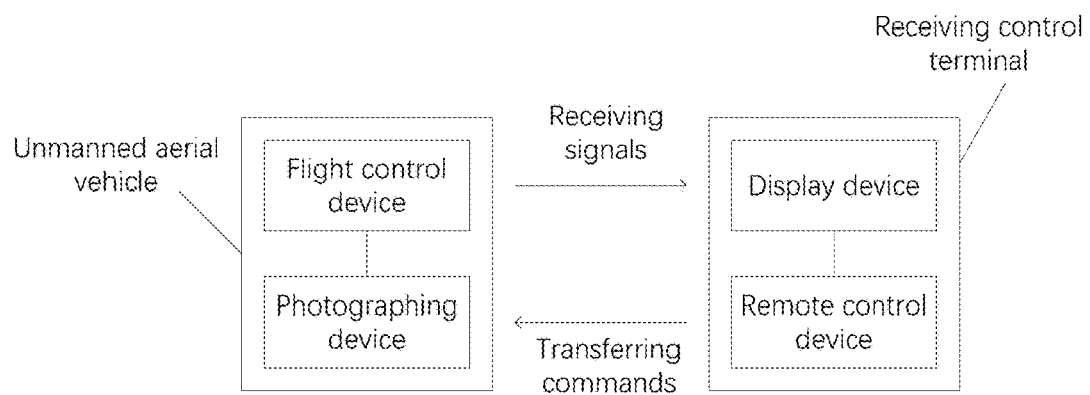
FIG. 3 is a block diagram illustrating components of a video display system based on an unmanned aerial vehicle viewing angle in Embodiment 2 of the present invention.

As shown in FIG. 3, a video display system based on an unmanned aerial vehicle viewing angle is disclosed in this embodiment, and the video display system includes an unmanned aerial vehicle and a receiving control terminal.

The unmanned aerial vehicle includes a photographing device, an image processing device and a flight control device. The photographing device is configured to shoot a video around the unmanned aerial vehicle. Taking the case where a spherical panoramic video is to be shot as an example, the photographing device in this embodiment includes two fisheye lenses, which are respectively installed on the upper and lower sides of the fuselage of the unmanned aerial vehicle, each fisheye lens protrudes from the surface of the fuselage, and the fields of view of the two fisheye lenses form an annular and overlapped field of view around the fuselage, thereby forming a 360-degree panoramic field of view. The image processing device (e.g., an image signal processing unit (ISP)) is used to perform stabilizing processing on the video shot by the photographing device, and in this embodiment, the image processing device may also be used to splice the video frames shot by two fisheye lenses into panoramic video frames. In this embodiment, the image processing device includes an image signal processor, and the image processing device may also be used for image processing such as automatic exposure, automatic gain control, gamma correction, white balance or the like. The image device may be installed on the unmanned aerial vehicle, the remote control device or the display device. The flight control device includes a global positioning system (GPS), an inertial measurement unit (IMU) and a microprocessor (MCU). The global positioning system (GPS) is used to obtain the spatial position of the unmanned aerial vehicle (i.e., the coordinate position in the world coordinate system), the inertial measurement unit (IMU) is used to obtain the flight direction of the unmanned aerial vehicle, and the microprocessor (MCU) is used to control the movement of the unmanned aerial vehicle according to the received control command. In addition, as shall be known by those of ordinary skill in the art, the unmanned aerial vehicle in this embodiment also includes necessary constituent hardware such as an obstacle detection device for detecting obstacles around the unmanned aerial vehicle, a graphic transmission device for sending the panoramic video to a display device, and a wireless transmission device (such as an RC controller) for receiving and sending control command.

The receiving control terminal includes a remote control device and a display device. The remote control device is used to send a flight control command of the user to the flight control device of the unmanned aerial vehicle. The remote control device includes but is not limited to a mouse, a joystick or a somatosensory remote controller. The flight control command includes but is not limited to the flight direction and the flight speed. The display device is used for displaying the panoramic video according to the display viewing angle. The display viewing angle includes the display direction, or includes the display direction and the size of the viewing angle.

It shall be noted that the display direction in the display viewing angle and the flight direction of the unmanned aerial vehicle are independent of each other, the display viewing angle is generated according to the input of the user or generated by detecting the movement of the user, and thus the display direction of the video may be the same as or different from the flight direction of the unmanned aerial vehicle. Specifically, the display viewing angle may be generated on the display device according to the operation of the user. For example, when the display device is a computer, the display viewing angle may be generated by operating the mouse, and when the display device is VR glasses, the display viewing angle may be generated by the head movement of the user detected by the VR glasses. The display viewing angle may also be generated by the user through operating the remote control device. For example, when the remote control device is a rocker, the display viewing angle is generated by detecting the moving direction of the rocker.

In some specific schemes of this embodiment, the remote control device and the display device of the receiving control terminal may be integrally designed as a VR helmet which may be provided with a flight control mode and a viewing mode. In the flight control mode, the flight direction of the unmanned aerial vehicle can be controlled by swinging the head; while in the viewing mode, the viewing angle display information can be generated by swinging the head and displayed on the VR helmet synchronously.

According to the scheme of the present invention, the flight direction of the unmanned aerial vehicle and the display viewing angle of the video around the unmanned aerial vehicle are independent of each other, and thus when the unmanned aerial vehicle changes the flight direction, the display viewing angle of the video around the unmanned aerial vehicle for viewing is not affected. Specifically, taking the case where the unmanned aerial vehicle is flying right forward and the viewing angle faces right forward as an example for illustration, when the unmanned aerial vehicle receives a command from the remote control device to fly to the right, the microprocessor (MCU) receives the obstacle information in the front and in the right of the unmanned aerial vehicle fed back by the obstacle detection module. If there is no obstacle, then the microprocessor controls the flight module to make the unmanned aerial vehicle fly to the right. Meanwhile, the inertial measurement unit (IMU) obtains the rotation angle of the unmanned aerial vehicle relative to the direction right forward, then the viewing angle display information is obtained according to the rotation angle and the attitude of the unmanned aerial vehicle, and then the corresponding part of the panoramic video obtained under the attitude of the unmanned aerial vehicle is displayed according to the viewing angle display information. As can be known from the above description, even if the moving direction of the unmanned aerial vehicle changes, the viewing angle of the user will not be changed, thereby improving the video viewing experience of the user based on the unmanned aerial vehicle viewing angle.

What described above are only the preferred embodiments of the present invention, and they are not intended to limit the present invention. Any modification, equivalent substitution and improvement made within the spirit and principle of the present invention shall be included in the scope claimed in the present invention.

The invention claimed is:

1. A video display method, comprising:
acquiring an attitude of an unmanned aerial vehicle;
acquiring a video around the unmanned aerial vehicle corresponding to the attitude, the video comprising a spherical panoramic video, an annular panoramic video or a wide-angle video;
acquiring a display viewing angle of the video; and
displaying a corresponding part of the video according to the display viewing angle;
wherein the display viewing angle and the attitude of the unmanned aerial vehicle are independent of each other,
the display viewing angle comprises a display direction and/or a size of the viewing angle,
the display direction of the video is the same as or different from a flight direction of the unmanned aerial vehicle, and
a degree of the display direction is determined by rotation angles respectively along axes of a flight coordinate system of the unmanned aerial vehicle or determined according to operation of users detected by a sensor.

2. The video display method according to claim 1, wherein the video is a video processed by stabilizing technology.

3. The video display method according to claim 1, wherein the attitude of the unmanned aerial vehicle comprises a flight direction and/or spatial coordinates of the unmanned aerial vehicle.

4. The video display method according to claim 1, further comprising:
changing the attitude of the unmanned aerial vehicle while maintaining the display viewing angle of the video; and
displaying the corresponding part of the video according to the display viewing angle while the attitude of the unmanned aerial vehicle is changed.

5. The video display method according to claim 1, wherein the viewing angle is determined according to a plurality of preset values, or enlarged or reduced through a touch screen of a visual terminal.

6. A video display system, comprising an unmanned aerial vehicle and a receiving control terminal;
wherein the unmanned aerial vehicle comprises a photographing structure and a flight controller, the photographing structure being configured to shot a video around the unmanned aerial vehicle, and the flight controller being configured to acquire an attitude of the unmanned aerial vehicle and control the movement of the unmanned aerial vehicle, wherein the video comprises a spherical panoramic video, an annular panoramic video or a wide-angle video;
the receiving control terminal comprises a remote controller and a display, the remote controller being configured to send a flight control command to the flight controller of the unmanned aerial vehicle; the display being configured to acquire a display viewing angle of a video, and display a corresponding part of the video according to the display viewing angle;
wherein the display viewing angle and the attitude of the unmanned aerial vehicle are independent of each other;
wherein the photographing structure comprises a panoramic camera;
wherein the display direction of the video is the same as or different from a flight direction of the unmanned aerial vehicle; and
wherein a degree of the display direction is determined by rotation angles respectively along axes of a flight coordinate system of the unmanned aerial vehicle or determined according to operation of users detected by a sensor.

7. The video display system according to claim 6, wherein the unmanned aerial vehicle further comprises an image processor to perform stabilizing processing on the video shot by the photographing structure.

8. The video display system according to claim 6, wherein the photographing structure comprises at least two lenses, and fields of view of adjacent lenses among the at least two lenses overlap each other to form a 360-degree panoramic viewing angle around the unmanned aerial vehicle.

9. The video display system according to claim 8, wherein the photographing structure comprises two fisheye lenses arranged on two opposite sides of the unmanned aerial vehicle.

10. The video display system according to claim 6, wherein the remote controller comprises a mouse, a joystick or a somatosensory remote controller.

11. The video display system according to claim 6, wherein the display comprises a VR helmet.

12. The video display system according to claim 6, wherein the flight controller is configured to control the movement of the unmanned aerial vehicle to change the attitude of the unmanned aerial vehicle, while the display is configured to maintain the display viewing angle of the video and display the corresponding part of the video according to the display viewing angle while the attitude of the unmanned aerial vehicle is changed.

13. The video display system according to claim 6, wherein the viewing angle is determined according to a plurality of preset values, or enlarged or reduced through a touch screen of a visual terminal.

* * * * *